United States Patent
Wechsel

(10) Patent No.: US 8,108,269 B2
(45) Date of Patent: Jan. 31, 2012

(54) SYSTEMS AND METHODS FOR MANAGING PRODUCT RETURNS USING DECISION CODES

(75) Inventor: Hilmar Wechsel, Leimen (DE)

(73) Assignee: SAP AG, Walldorf (DE)

( * ) Notice: Subject to any disclaimer, the term of this patent is extended or adjusted under 35 U.S.C. 154(b) by 1521 days.

(21) Appl. No.: 10/787,206

(22) Filed: Feb. 27, 2004

(65) Prior Publication Data

US 2005/0216368 A1 Sep. 29, 2005

(51) Int. Cl.
*G06Q 10/00* (2006.01)
*G06Q 30/00* (2006.01)

(52) U.S. Cl. .......................................... 705/28; 705/340

(58) Field of Classification Search ............... 705/28, 705/26

See application file for complete search history.

(56) References Cited

U.S. PATENT DOCUMENTS

| | | | |
|---|---|---|---|
| 5,984,508 A * | 11/1999 | Hurley | 700/237 |
| 6,085,172 A | 7/2000 | Junger | |
| 6,269,344 B1 | 7/2001 | Junger | |
| 6,463,421 B2 | 10/2002 | Junger | |
| 6,473,893 B1 | 10/2002 | Kay et al. | |
| 6,536,659 B1 * | 3/2003 | Hauser et al. | 235/375 |
| 6,687,897 B2 * | 2/2004 | Guinart | 717/143 |
| 6,754,637 B1 * | 6/2004 | Stenz | 705/26 |
| 6,757,663 B1 * | 6/2004 | Rogers et al. | 705/24 |
| 6,941,353 B1 * | 9/2005 | Lane | 709/219 |
| 6,947,941 B1 * | 9/2005 | Koon | 707/100 |
| 6,970,826 B2 * | 11/2005 | Christensen et al. | 705/1 |
| 7,055,741 B2 * | 6/2006 | Bong et al. | 235/382.5 |
| 7,058,581 B1 * | 6/2006 | Young | 705/1 |
| 7,069,236 B1 * | 6/2006 | Tsunenari | 705/26 |
| 7,171,380 B2 * | 1/2007 | Chiu et al. | 705/28 |
| 7,266,513 B2 * | 9/2007 | Chalmers et al. | 705/26 |
| 7,318,047 B1 * | 1/2008 | Foth et al. | 705/39 |
| 2001/0032143 A1 * | 10/2001 | Haseltine | 705/26 |
| 2001/0047315 A1 * | 11/2001 | Siegel | 705/28 |
| 2002/0019785 A1 * | 2/2002 | Whitman | 705/28 |
| 2002/0138356 A1 * | 9/2002 | Dutta et al. | 705/26 |

OTHER PUBLICATIONS

"ClickShip Direct, Inc. Bolsters Returns Processing Capability; Expanded Facility, New Returns Line Increases Processing Capacity", Business Wire, Dec. 6, 2000.*

U.S. Appl. No. 10/787,205, entitled: "Systems and Methods for Managing Product Returns Using Return Authorization Numbers", filed Feb. 27, 2004.

* cited by examiner

*Primary Examiner* — Matthew S Gart
*Assistant Examiner* — Oluseye Iwarere
(74) *Attorney, Agent, or Firm* — Finnegan, Henderson, Farabow, Garrett & Dunner LLP

(57) ABSTRACT

Systems and methods are disclosed for processing a product return. The systems and methods may capture a disposition decision for the product return in a first management system and trigger, in response to the captured disposition decision, at least one process in a second management system. In one embodiment, the first management system comprises a warehouse management system and the second management system comprises a customer relationship management system.

42 Claims, 7 Drawing Sheets

| Disposition code | Follow-up activity | CRM-notification | Effort code |
|---|---|---|---|
| 1001 | Put away | good | 00 |
| 1002 | Scrap | good | 00 |
| ...... | | | |
| 2001 | Rework | partially good | 02 |
| ...... | | | |
| 3001 | Scrap | bad | 10 |
| 3002 | Reject to customer | bad | 15 |

FIG. 6

| Effort code | Effort value | UOM |
|---|---|---|
| 01 | 1 | hour |
| 02 | 2 | hours |
| 03 | 3 | hours |
| 04 | 4 | hours |
| ... | | |
| 10 | 100 | $ |
| 11 | 110 | $ |
| 12 | 120 | $ |
| 15 | 150 | $ |
| ... | | |

FIG. 7

SYSTEMS AND METHODS FOR MANAGING PRODUCT RETURNS USING DECISION CODES

BACKGROUND OF THE INVENTION

I. Field of the Invention

The present invention relates to systems and methods for managing product returns. More particularly, the present invention relates to systems and methods for managing product returns using decision codes as control instruments for processing the product returns.

II. Background Information

Software and computer-implemented management systems have not only become commonplace, but are nearly indispensable to businesses large and small. For example, in sales, such systems may be used to manage the various aspects of a sale, from customer account information to inventory, product movement, scheduling, and shipping information. While these systems are often quite efficient for tracking sales information and managing customer accounts, they are often inefficient in tracking other information necessary for the accurate resolution of returns.

The management of product returns from customer account management involves the accurate exchange of information between various entities and/or employees, such as shipping companies, warehouse employees, and account managers. For example, a customer relationship management (CRM) module may manage the customers account from authorization of a return request to issuing of credit, while a warehouse management (WM) module may manage the physical handling of returns and other items within the warehouse.

Despite such advances, current systems and methods for managing product returns suffer from several drawbacks. For example, current solutions do not provide for the efficient handling or transferring of information for product returns. This is particularly a problem where multiple management systems are involved and the relevant information must be transferred between different systems. Also, there is a problem in the art in that present methods and systems for managing product returns cannot insure for the consistent processing and handling of a product return by, for example, a customer relationship management system and a warehouse management system. Such systems must insure that once a product has been returned, the returning customer's account is accurately updated to reflect the true disposition of the returned product. Efficient and accurate accounting of this information requires proper handling of the return and communication between the different software packages and computerized management systems, which, to date, is unavailable.

SUMMARY OF THE INVENTION

Consistent with embodiments of the present invention, systems and methods are disclosed for processing a product returns. Such embodiments include capturing a disposition decision for the product return in a first management system and triggering, in response to the captured disposition decision, at least one process related to the product return in a second management system.

Further, in accordance with one embodiment, a method is provided for processing a returned product. The method may include: inspecting a returned product to determine a disposition of the returned product; capturing, in a first management system, a decision code representing the disposition, the decision code uniquely identifying a set of activities; and triggering each activity identified by the decision code, wherein at least one of the activities is triggered in a second management system.

According to another embodiment, systems and methods are provided for processing a product return from a customer. The systems and methods may include: providing a set of decision codes; inspecting the product return at a warehouse and selecting a decision code from the set of decision codes based on an inspection result; updating a record for the product return to include the decision code selected from the set of decision codes; and triggering an activity to be performed for the product return based on the decision code in the record.

According to yet another embodiment, a computer readable medium is provided that comprises instructions for carrying out a method for processing a product return. The method may include: capturing a disposition decision for the product return in a first management system; and triggering, in response to the captured disposition decision; at least one process related to the product return in a second management system.

According to still another embodiment, a computer readable medium is provided that comprises instructions for carrying out a method for processing a product return. The method may include: inspecting a product return to determine a disposition of the product return; capturing, in a first management system, a decision code representing the determined disposition of the product return, the decision code uniquely identifying a set of activities; and triggering each activity identified by the decision code, wherein at least one of the activities is triggered in a second management system.

According to another embodiment, a computer readable medium is provided that comprises instructions for carrying out a method for processing a product return. The method may include: providing a set of decision codes; updating, in a first management system, a record for the product return to include a decision code from the set that corresponds to a disposition decision for the product return; and triggering, in a second management system, a process to be carried out based on the disposition decision.

According to yet another embodiment, a system is provided for automatically processing a product return. The system may include: a first management module for receiving a decision code and creating, in response to receiving the decision code, a first record relating to the product return; and a second management system for receiving the first record and for initiating an update to a second record in response to receiving the first record.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings:

FIG. 6 illustrates examples of disposition codes, consistent with the present invention; and FIG. 7 illustrates examples of effort codes, consistent with the present invention.

DETAILED DESCRIPTION

Figure 1:
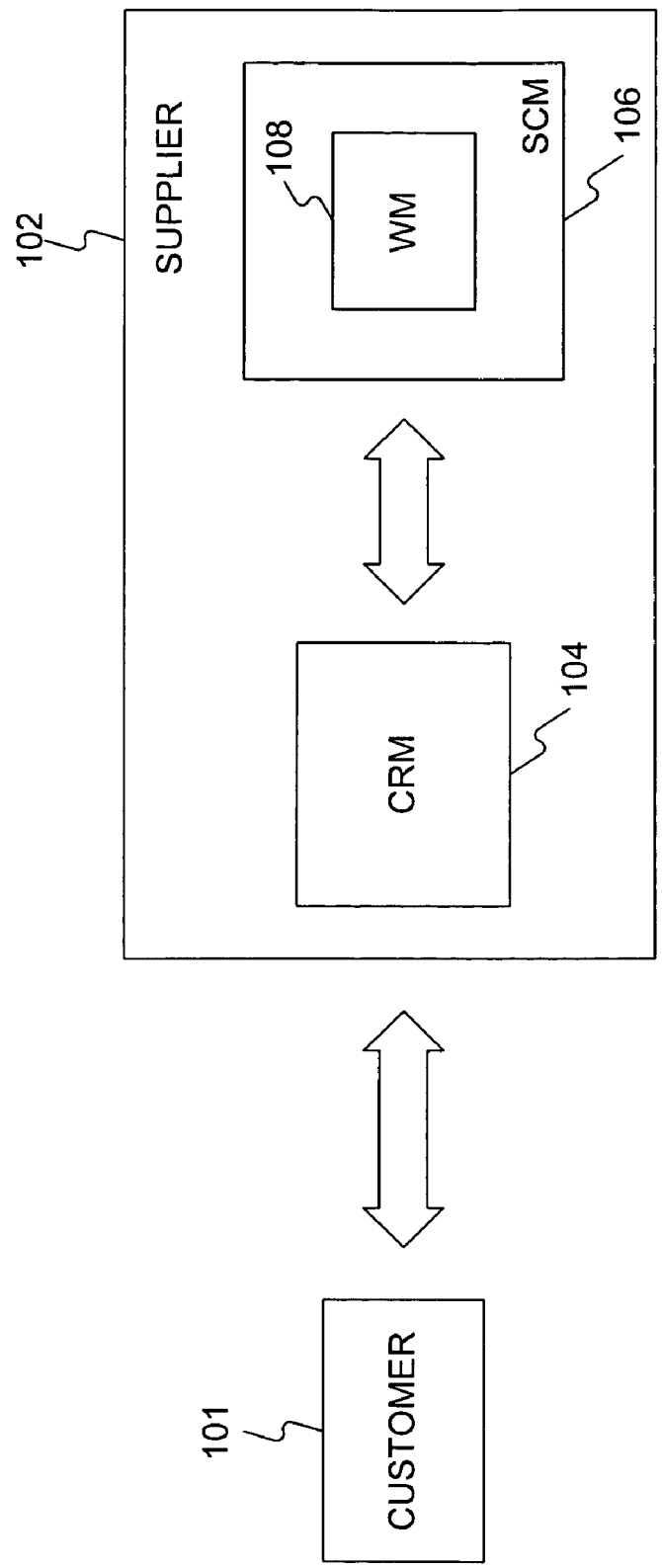
FIG. 1 illustrates an exemplary environment including a customer and a supplier of products, consistent with the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding steps to the disclosed methods. Accordingly, the following detailed description does not limit the invention. Instead, the proper scope of the invention is defined by the appended claims.

FIG. 1 illustrates an exemplary environment, consistent with the invention, that includes a customer 101 and a supplier 102. As will be appreciated from the teachings hereof, FIG. 1 provides a practical example of an environment in which embodiments of the invention may be implemented.

In the block diagram of FIG. 1, a buyer-seller relationship or similar arrangement is depicted between customer 101 (the "buyer") and supplier 102 (the "seller") of products. As used herein, the term "product" refers to any good, item or merchandise supplied or sold by supplier 102. By way of example, a product may be a finished product or may be any part or item used for manufacturing or providing a finished product. A product may also be any good or item for providing services to other customers.

In the example of FIG. 1, customer 101 refers to any entity who purchases or otherwise receives a product from supplier 102. By way of example, customer 101 may be any entity, such as an individual consumer or a business entity such as a manufacturer, a dealer (e.g., an automotive dealer), or a supplier who purchases products from supplier 102 for future resale or transfer to another party. Supplier 102 may be any entity, such as an individual or business entity, who sells or otherwise provides products or goods to a customer, such as customer 101. As will be appreciated by those skilled in the art, more than one customer or supplier may exist, depending on the number and type of buyer-seller relationships formed. For example, in one embodiment, supplier 102 may sell or provide products to a plurality of customers.

As shown in FIG. 1, supplier 102 may have one or more management systems or modules 104 and 106. These management systems may be implemented with any suitable combination of computer hardware, software and/or firmware to manage and process data relevant to interactions with customer 101 and/or the sale or distribution of products. For example, customer relationship management (CRM) module 104 may be used to manage all processes and information involving the customer throughout the entire customer relationship life cycle, from market segmentation, sales lead generation and opportunities, to post-sales and customer service. CRM 104 may also manage various business scenarios such as field sales and service, Internet sales and service, and direct customer interactions, including interactions related to processing a product return from customer 101.

CRM 104 may be in electronic communication with one or more other management systems of supplier 102, such as a supply chain management (SCM) module 106. SCM 106 may manage the various aspects of a supply chain, including, but not limited to, inventory, product movement, and scheduling of product shipping. As will be appreciated by those skilled in the art, CRM 104 or SCM 106 may include one or more subcomponents. For example, FIG. 1 shows warehouse management (WM) module 108 as a subcomponent of SCM 106. WM 108 may manage processes and information related to one or more warehouses, such as shipping, receipt of parts, and/or inventory levels, and information related thereto. WM 108 may also manage specific processes at a warehouse level, such as the handling and disposition of product returns.

In one embodiment, CRM 104, SCM 106 and WM 108 are implemented as software modules or components and capable of performing the functions and tasks disclosed herein. Additionally, or alternatively, CRM 102, SCM 106, and WM 108 may be implemented with or include one or more database(s), such as relational databases, designed, maintained, and operated in accordance with the teachings hereof. In one embodiment, a centralized database is used for all management systems of supplier 102. In another embodiment, individual databases are provided for storing data relevant to each management system (e.g., CRM 104 and SCM 106/WM 108). Further, if CRM 104, SCM 106 and WM 108 are implemented using a plurality of software modules and/or databases, the various software modules and/or databases may be in electronic communication with each other for the purpose of passing information back and forth. Such communication may be accomplished over conventional wired and/or wireless networks using, for example, a web (Internet) gateway or portal, e-mail, an electronic data interchange (EDI), an open-interface such as a Basic Application Interface (BAPI), XML, and/or any other known or later developed electronic messaging protocols or systems.

In one embodiment, CRM 104, SCM 106 and WM 108 are integrated and operate within a common platform. Such a platform may provide easy integration of additional components and/or a standard communication format for communication among the various software components or modules. One example of such a platform is the R/3 system available from SAP AG (Walldorf, Germany). In an R/3 system, "information objects" may be employed to pass information from one integrated component or module to another.

Figure 4:
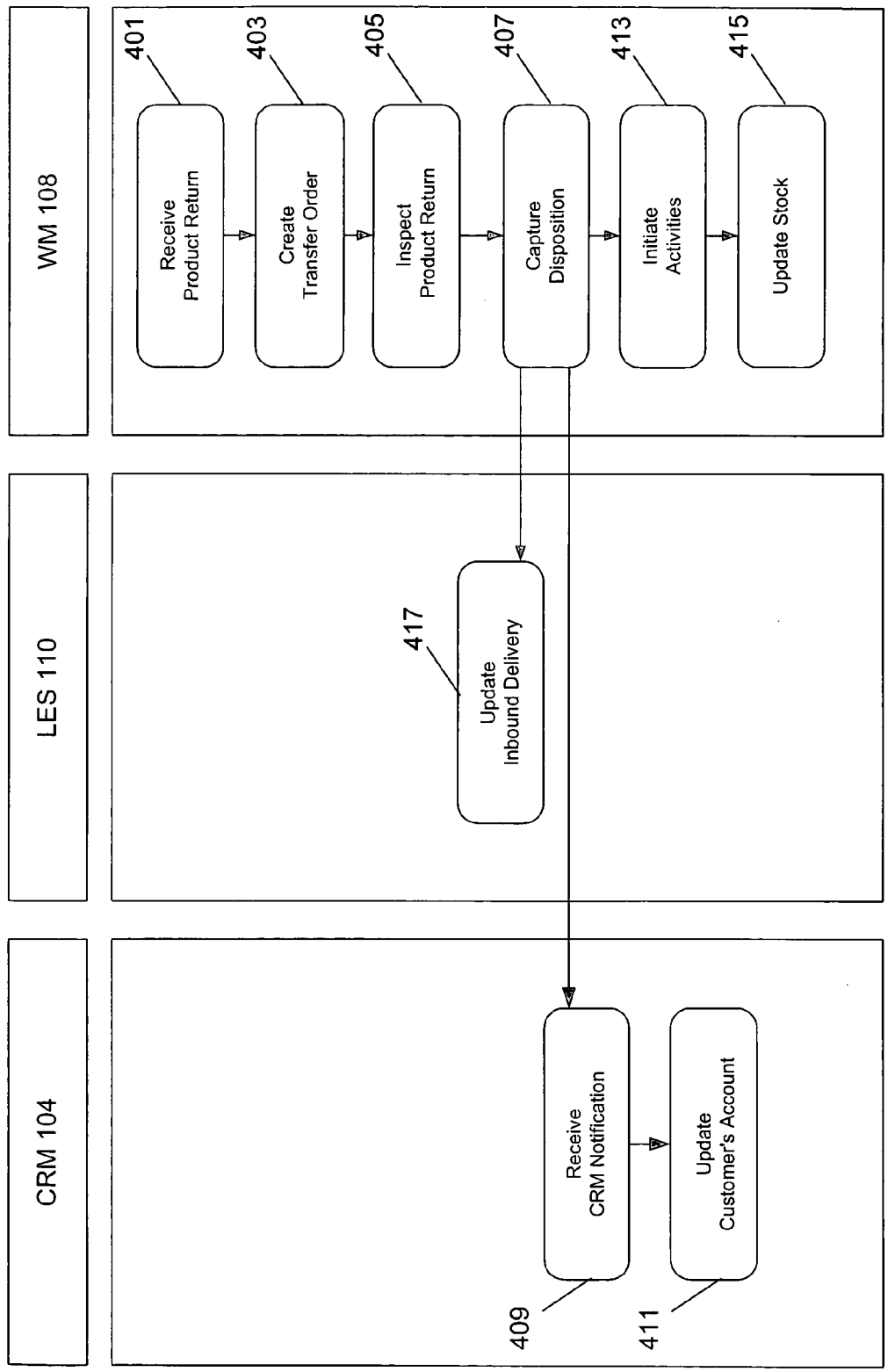
FIG. 4 is a flowchart depicting another exemplary method for processing product returns, consistent with the present invention.

Further, additional components may be provided, such as a Logistics Execution and Shipping (LES) module An example of an LES component 110 is shown in FIG. 4 and further described below. In general, LES 110 may manage all deliveries (Inbound/Outbound) and delivery procedures (like calling an ATP check). LES 110 may also provide an interface between different management systems, such as CRM 104 and WM 108. As with CRM 104 and WM 108, LES 110 may be implemented as a software-based module or component. By way of example, LES 110 may be implemented as a logistics execution and shipping module in an R/3 system.

Figure 2:
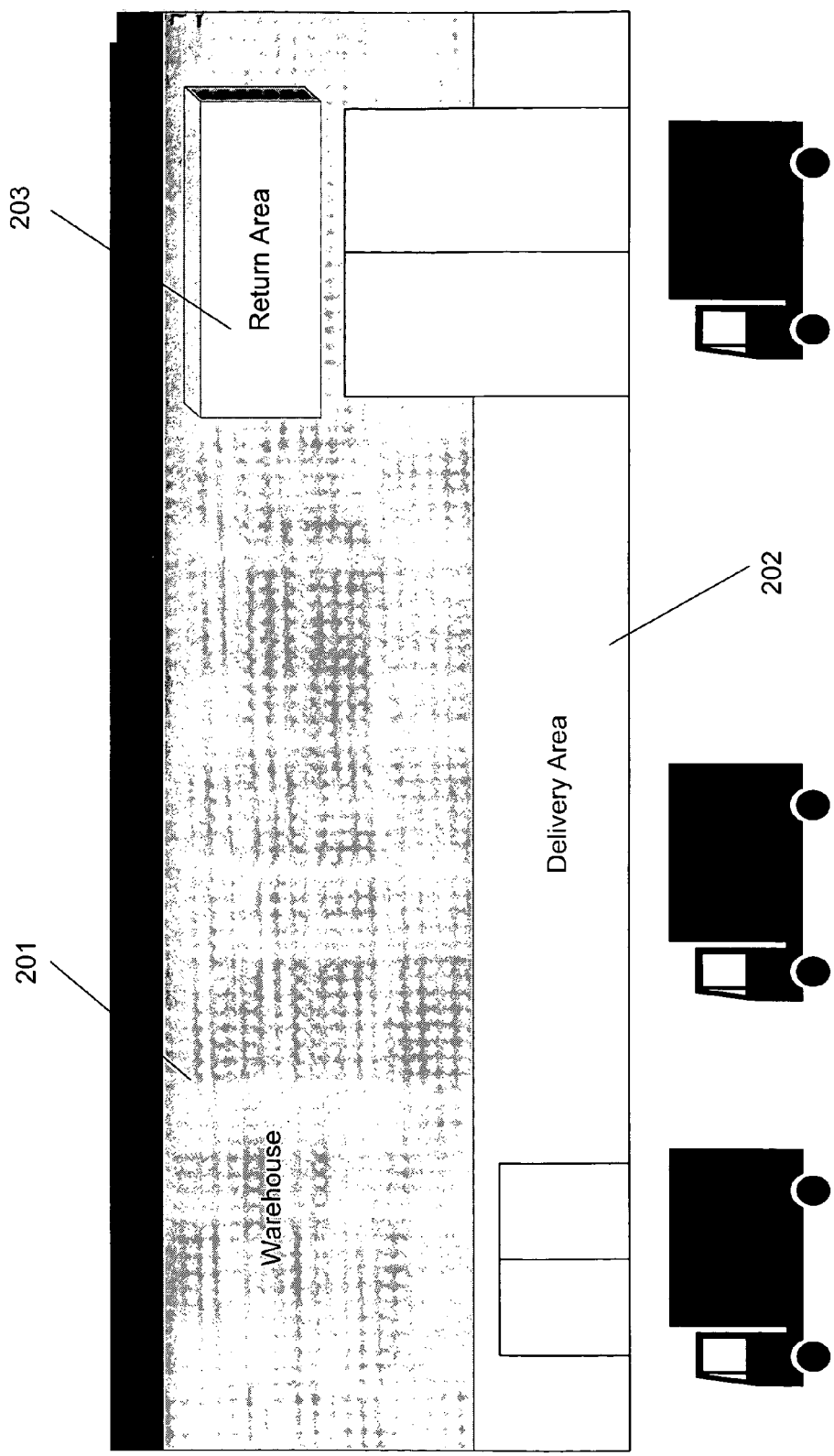
FIG. 2 illustrates an exemplary warehouse environment in which systems and methods consistent with the present invention may be implemented.

FIG. 2 illustrates an exemplary warehouse environment in which systems and methods consistent with the present invention may be implemented. In FIG. 2, a warehouse 201 is shown that serves as a facility for handling product returns. Warehouse 201 may include a number of areas, such as a delivery area 202 for receiving product returns and a return area 203 for storing product returns prior to and/or during processing of the product returns. By way of example, returned goods may be temporarily stored in return area 203 for inspection prior to final disposition of the returned goods.

Consistent with the present invention, warehouse 201 may be, but need not be, owned and operated by supplier 102. One of ordinary skill in the art will recognize, however, that the relationship between warehouse 201 and supplier 102 may take many forms and is therefore not critical to the present invention. For instance, warehouse 201 may be owned or operated by a third party or entity on behalf of supplier 102. These and other forms of ownership or operation may be provided so long as the management systems and methods for handling product returns are performed in accordance with the teachings hereof.

Figure 3:
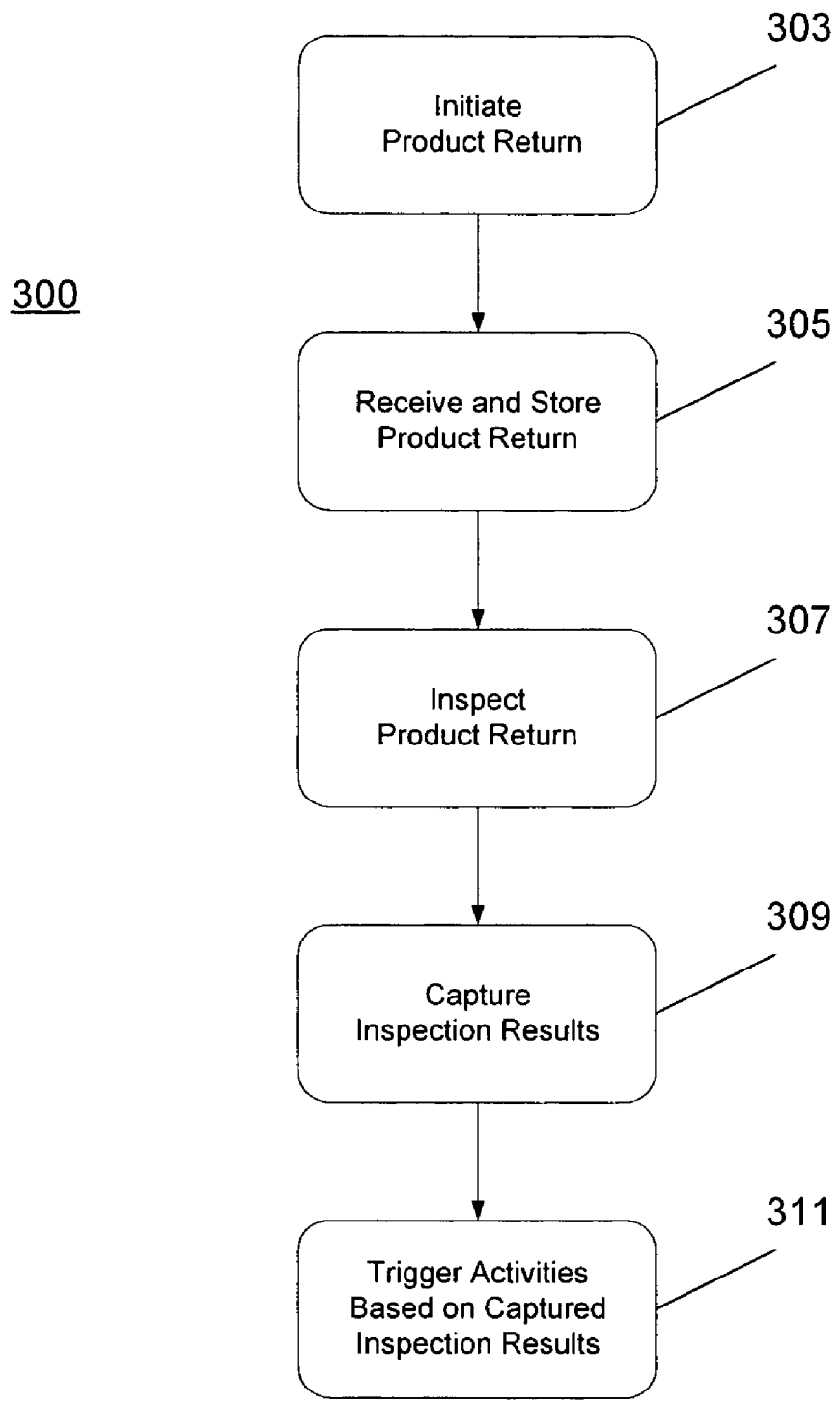
FIG. 3 is a flowchart depicting an exemplary method for processing product returns, consistent with the present invention.

FIG. 3 is a flowchart depicting an exemplary method 300 for processing product returns, consistent with the present invention. As shown in FIG. 3, method 300 begins with the initiation of the product return, step 303. In one embodiment, a customer may initiate a product return by shipping or mailing the returned product(s) to the supplier. In another embodiment, a customer may first seek approval for the product return before returning the product(s) to the supplier. For example, with reference to the embodiment of FIG. 1, customer 101 may initiate a product return by contacting and requesting approval from supplier 102. The customer's request for a return authorization may be handled by a management system of supplier 102, such as CRM 104. The requested product return may correspond to any quantity or set of products sold or supplied by supplier 102. To determine whether to approve the product return request, CRM 104 may evaluate the terms or conditions of a sales contract or other agreement between customer 101 and supplier 102, the status of customer 101, and/or any other criteria. If the requested product return is approved, CRM 104 may communicate the return authorization to customer 101 and, thereafter, customer 101 may mail or ship the returned product(s) to supplier 102.

As indicated above, approval of a product return may be handled through the CRM of a supplier. Consistent with the present invention, the techniques and features disclosed in U.S. patent application Ser. No. 10/787,205, entitled "Systems and Methods for Managing Product Returns using Return Authorization Numbers," the contents of which are expressly incorporated by reference herein, may be implemented as part of step 303 to initiate and manage a product return. In such embodiments, the approval and management of the product return may utilize a unique identifier, such as a Return Authorization Number (RAN). As disclosed in U.S. patent application Ser. No. 10/787,205, the unique identifier may serve as a control instrument for handling the product return and passing information between different management systems, such as CRM 104 and WM 108 of supplier 102. In accordance with this approach, only approved returns may be initiated and managed by CRM 104 and WM 108.

Referring again to FIG. 3, customer 101 may return the product(s) to supplier 102, such as by mailing or shipping it to warehouse 201, step 303. Upon receipt of the product return by warehouse 201, the product is unloaded and stored in an area of warehouse 201, such as return area 203, step 305. Thereafter, the product return may be inspected, step 307, with the results of the inspection being captured in one or more management system(s), step 309. To capture the inspection results, records may be created and stored in each of the management system(s). Based upon the results of the inspection captured in the management system(s), employees of warehouse 201 and/or supplier 102 may conduct the appropriate activities, step 311. Examples of activities are further disclosed below and with reference to, for example, FIG. 4.

As part of capturing the inspection results (step 309), warehouse management WM 108 may communicate the inspection results to CRM 104. Communication between WM 108 and CRM 104 may be accomplished using various means, such as conventional wired and/or wireless networks using a web (Internet) gateway or portal, e-mail, an electronic data interchange (EDI), or an open-interface such as a Basic Application Interface (BAPI), XML, and the like. To communicate the inspection results, WM 108 may send a message or notification that identifies the product return and corresponding inspection results. In one embodiment, product returns are identified in the message by a unique identifier, such as a RAN. In another embodiment, the results of inspection are identified by a code, such as a decision or disposition code. As further disclosed herein, such a code may indicate the determined disposition of the product return based on the inspection at the warehouse. Additionally, the code may indicate what activities need to be triggered at the warehouse level (e.g., through WM 108) and/or customer account or relations level (e.g., through CRM 104).

Depending on the circumstances, various types of activities may be triggered (step 311). For example, it may be required that a full credit for the product return be issued to a customer 101 or that credit be issued at various stages and/or proportionally to the customers credit rating (e.g., 100% prior to Goods Receipt for Customer 1 versus 80% prior to Goods Receipt and the remaining 20% upon inspection of the material for Customer 2). Consistent with the present invention, such crediting and management of customer accounts may be performed through CRM 104 based on the capturing and notification of the inspection results by WM 108.

FIG. 4 is a flowchart depicting another exemplary method 400 for processing product returns, consistent with the present invention. As shown in FIG. 4, method 400 begins with receipt of the product return, step 401. In one embodiment, the customer may provide a receiving document (or "delivery note"), with the product return. The receiving document (delivery note) may contain such key-data as a return authorization number, a material number, a batch number, and/or a serial number to allow proper matching of the product return with the record(s) utilized by the management system(s), such as, but not limited to a Warehouse-Request (WH Request) in WM 108.

A WH Request is a data structure, record, or file (such as an information object in a R/3 system) created by WM 108, which may be used for managing and tracking product returns at the warehouse level. In one embodiment, each WH Request may contain information concerning the delivery of a product return from a customer. Such information may include, but is not limited to, the type of product being returned, the quantity of items to be returned from the customer, a return code, and a unique identifier or RAN associated with the product return. Exemplary embodiments related to the creation and use of a WH Request, including the RAN, are further described in U.S. patent application Ser. No. 10/787,205.

Once the returned materials arrive at the warehouse, step 401, WM 108 may issue a transfer order, step 403, to transfer the returned items from, for example, delivery area 202 to return area 203 (see FIG. 2). A transfer order (or "TO") is an instruction to move materials from a source location (such as a source storage bin) to a destination location (such as a destination storage bin) within a warehouse complex, such as warehouse 201. A TO may contain information such as, but not limited to, the quantity of the material to be moved, the source and destination locations, and the RAN associated with the product return. In the case of step 403, the TO may request the transfer of the product from delivery area 202 to return area 203, as indicated above.

Temporary storage in return area 203 allows the warehouse employees to inspect the products returned and to asses their condition, step 405, prior to transferring or disposing of them. The inspection may be used to determine the set of activities necessary for the proper disposition of the product return. The inspection results may, therefore, require action by one or more individuals or management systems, such as CRM 104 or WM 108. By way of non-limiting examples, the inspection results may trigger one or more of the following activities:

Follow-Up Activity: the physical movement from the return area to other areas inside the warehouse or to another facility. For example, if the returned product is in re-sellable condition, it can be put away, otherwise, it may need to be scrapped. These results may require updating of records within WM 108 to reflect the location of the product.

Customer Management: the issuing of credit to/or charging of customer 101. For example, if the material is in re-sellable condition, customer receives the full amount of the possible credit for the returned material. If not (maybe the material is damaged), customer 101 will not receive the full amount of the possible credit. A CRM Notification from WM 108 may be issued to CRM 104 to trigger the updating of record(s) in the CRM, thus effecting the credit to the customer (or other management of the customer account to reflect the return).

Additional Effort: the remanufacturing or repackaging the material (to bring it back into sellable condition), in which case customer 101 may be charged for the additional effort. Additional effort may require updating of records within the WM 108 (such as to accomplish transfer of the product to a refurbisher) and/or of the CRM 104 (to accomplish charging of customer 101). In this way it is possible to capture hours worked and material used in the refurbishing or other additional effort, which will result in a separate bill to customer 101.

One of ordinary skill in the art will recognize that the above-listed activities are merely examples of the types of processing activities that may be determined by the inspection results. It is well within the spirit and scope of the present invention to include other processing activities and/or to modify the exemplary ones, as may be required by other management systems or suppliers depending on the needs of their industry.

In one embodiment, during inspection, a usage or disposition decision is made by an inspector at the warehouse. Such a usage or disposition decision may control which set of activities (e.g., the Follow-up Activities, Customer Management and/or Additional Effort) must take place for final disposition of the product return.

Consistent with the present invention, the results of the inspection are captured, step 407. For example, in one embodiment, the inspection results are captured in one or more management systems (e.g., WM and/or CRM). To capture the inspection results at the warehouse, a code such as a disposition or decision code may be recorded. By way of example, the inspection results may be captured in WM 108 as a part of a WH Request associated with the product return. In the WH Request, capture of the usage or disposition decision can be done utilizing a disposition or decision code. The decision code may be selected from a predefined and/or customizable set of codes, each of which may consist of numbers or letters or any combination thereof.

In one embodiment, the set of decision codes can be related to different characteristics each having a different value. For example, for a returned material, which is in re-sellable condition and the full amount of the credit can be issued, a unique decision code can be defined such that the decision code triggers:

a characteristic Follow-up Activity associated with the code value; and a characteristic CRM Notification with the code value.

Or if a product must be remanufactured, a specific decision code value (e.g., "Reman") may trigger:

a characteristic Follow-up Activity with the value stock transfer (to cause the product to be transferred to the remanufacturing facility);

a characteristic CRM Notification with the value accepted to trigger a credit for that value to the customer; and a characteristic Additional Effort with the value effort code identifying that the customer must be charged by the CRM for the remanufacturing.

Other exemplary decision codes may reflect that the returned product is damaged, obsolete, surplus, wrongly ordered material or that the product return is refused (e.g., late shipments), exchanged, or part of a product recall.

In one embodiment, the decision code for capturing the usage decision will be customizable, with each decision code related to one CRM Notification, one Follow-up Activity, and/or one Additional Effort. In another embodiment, one or more of the CRM Notification, the Follow-up Activity, and the Additional Effort may be "NULL." For example, usage or disposition decisions can be: (1) that a returned product is saleable and can be stored as unrestricted stock; (2) that a product must be reworked; (3) that material must be scrapped; or (4) that a returned product must be rejected to the customer. Alternatively, the WM 108 may capture the Follow-up Activity, Customer Management, and Additional Effort each as an independent decision code. One of ordinary skill in the art will recognize that the values of the decision codes, as well as the Follow-up Activities, CRM Notifications, and/or Additional Effort triggered by them may be tailored to specific industries, products, suppliers, or customers within the spirit of the present invention.

The recording of the usage decision may then automatically trigger the required processing activities identified by the decision code. For example, WM 108 may automatically issue a transfer order and perform one or more follow-up activities on the returned product, step 413. Further, WM 108 may send a CRM Notification to CRM 104, step 409, to update customer 101's account based on the additional effort and/or trigger other customer management, step 411, as required by the decision code.

Updating Additional Effort and Customer Management, step 409, may each be accomplished by sending a CRM Notification from WM 108 to CRM 104. The CRM Notification may include a RAN (to allow for the creation and/or identification of records associated with the product return in CRM 104), and the decision code. The decision code will then trigger CRM 104 to update customer 101's account to reflect the appropriate credit, charge or other update to the account, step 411. Note that by passing the decision code, it is not necessary (but is permitted) to pass additional information, such as the customer account number, amount, type of maintenance required (e.g., charge, credit, etc.), or other information. By passing the decision code, CRM 104 may be preprogrammed to perform a specific function (e.g., a decision code identifying "Reman," may trigger the automatic credit of the sale amount, and charge of the additional effort required). In addition, the RAN can be used to determine the amount of the credit and of the charge by identifying the CRM Notification with the appropriate record(s) in the management system. By way of example, standard CRM Notifications may include:

Return accepted—This notification triggers credit of the sale amount to customer 101's account. This can apply for: put-away, scrapping (if decided by the warehouse or CRM) and rework;

Return rejected—This notification triggers no change to customer 101's account. This can apply for: scrapping (if caused by the customer) and reject back to customer;

Phantom material returned—No activity is triggered until the identity of the product is associated with the decision code. This applies if a material with a unknown material number was returned; and Wrong material returned—This may trigger the CRM to create a new return request, for example. This notification may be issued if a certain RAN was issued for material A but, in reality, material B was delivered.

Prior to, simultaneous with, or after updating CRM 104, the decision code may also trigger the warehouse 201 to carry out processes, step 413, such as Follow-up Processes required by the decision code. This may be accomplished by creating a new WH Request or Transfer Order.

The new WH Request or Transfer Order may be associated with the RAN and the decision code, and may alert warehouse employees to move or treat (i.e., scrap) the product as identified in the WH Request. Examples of Follow-up Processes include:

Put-away: A WH Request for put-away into unrestricted and saleable stock will be created. For example, WM 108 may determine a storage bin in which to place the product;

Transfer stock: If the inspection happened in a return/core center, a WH Request for stock transfer to the receiving warehouse will be created. In the receiving warehouse, the put-away is carried out and the material can be released for unrestricted use;

Scrap: A WH Request for scrapping will be created. This request initiates the scrapping process. The material may stay in un-valuated customer stock. During scraping it will be possible to capture additional effort in the CRM with reference to the RAN.

Reject back to customer: A WH Request for packing and/or shipping can be created. This WH Request will initiate all other activities which are required to ship the material properly back to the customer, including all required shipping documents. Special requirements (like goods issue from "non-salable bucket" or printing of export documentation) can also be met automatically in response to this WH Request type.

In accordance with the WH Request or Transfer Order, employees of WM 108 will then update the stock by moving or treating the product, step 415.

In addition, as shown in FIG. 4, the decision code may also trigger updates for other records utilized by the management system(s) including, but not limited to, an inbound-delivery, step 417, of the LES 110. As previously noted, other processing activities may be defined according to the requirements of the supplier, consistent with the present invention. One of ordinary skill in the art will recognize that as these additional/modified activities are required, additional decision codes may be created (or modified) to trigger these activities in CRM 104, WM 108, LES 110, and/or other management systems. Other exemplary records which may be utilized by management system(s) in accordance with the present invention are further described in U.S. patent application Ser. No. 10/787,205.

By way of example, in one embodiment, following an inspection that leads to the result "remanufacture," a warehouse employee or inspector need only capture the appropriate disposition or decision code, such as "Reman." Capturing this disposition code would automatically:

trigger all system activities in the warehouse to transfer the material to a re-manufacturing facility (i.e., a particular Follow-up Activity);

send the CRM Notification "accepted" to the CRM system. The CRM can issue credit or not, based on its relationship with customer 101;

send an effort code to the CRM system. The CRM can translate the effort code into a certain amount, which can be charged to dealer (i.e., a particular Additional Effort).

All the above-noted activities may be initiated automatically by capturing the disposition code. No additional action by the warehouse employee is required.

Alternatively, a usage decision can be taken in CRM 104 before the customer sends the materials back to the warehouse. CRM 104 may send this usage decision via LES 110 to WM 108. WM 108 may store the usage decision in the WH Request associated with the product return. Upon receipt, a transfer order will be created and processed in the same way as described in above. However, depending on the predetermined usage decision, the TO may include a different destination location (other than return area 203), and a field such as "process type" may be used for to identify a routing decision inside the warehouse. By way of example, if the returned material is to be scraped, a scrap area can be included as the destination location for that process type. The confirmation of the TO triggers the creation of a new WH Request (e.g., movement of the product to the scrapper). The new WH Request will be created based on the usage decision (which is known by the WH Request) and the related follow-up process. But in contrast to method 400, the creation will happen automatically (without the need for inspection). For example: If the usage decision is related to the follow-up process "Scrapping", a WH Request for scrap will be created in the background without any user interaction.

In addition, inspection, step 405, may allow proper disposition of unidentified goods. For example, when a product return is unidentifiable prior to receipt and inspection, the management system(s) may record a dummy part number in their various record(s) associated with the return. For example, CRM 104's return authorization may issue a dummy part number of (e.g., "XXX"). Upon receipt, however, the product may be inspected for identification, and the dummy identifier may be replaced by the actual product number. This product number may also be communicated to the various management system(s), such as by using the RAN, to update all records, files or data structures for that product return.

Figure 5:
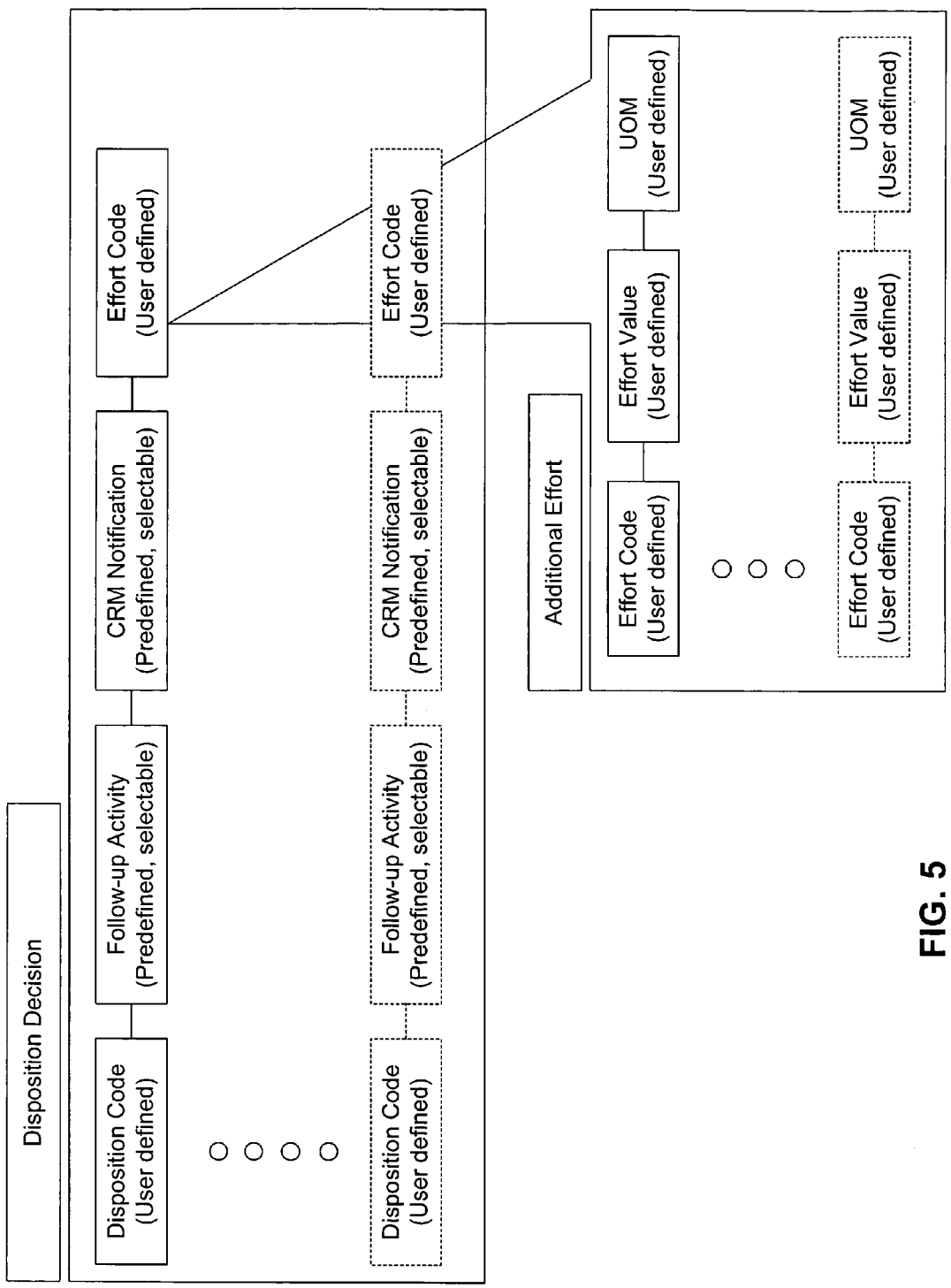
FIG. 5 illustrates an exemplary embodiment of a data structure comprising a decision code, consistent with the present invention.

FIG. 5 shows an exemplary embodiment a data structure or record including a disposition or decision code. The exemplary data structure may be created during inspection of a product return and may be recorded through WM 108. All or part of the data contained in the exemplary data structure may be communicated to CRM 104 by WM 108.

As show in FIG. 5, the data structure may comprise a disposition code (or decision code) for each returned product. As indicated above, a disposition code may correspond to a particular follow-up activity and may be predefined by a user (such as supplier 102) to trigger such an activity when it is selected and recorded by an inspector. In one embodiment, when an inspection of a returned product is made, the inspector may select from a set of disposition codes and enter the appropriate disposition code that reflects the results of his/her inspection. In addition to defining a particular Follow-up Activity (e.g., resell, refurbish, scrap, etc.), the disposition code may also define a particular CRM Notification. By way of example, the CRM Notification may indicate the condition of the returned goods (e.g., good or accepted, bad or ejected, etc.). As indicated above, through the CRM Notification, the CRM can decide how to resolve the product return at the customer account or relations level (e.g., issue credit or not, etc.). Examples of disposition codes are shown in FIG. 6

In addition to a disposition code, an inspector or warehouse employee may also enter an effort code that reflects the inspection results. The effort code may entered and stored with the disposition code through WM 108. The effort code, like the disposition code, may consist of any combination of characters (numeric, alphabetic, etc.) and may be communicated by WM 108 to CRM 104. Through the effort code, CRM 104 can determine an amount to charge (if applicable) customer 101 for Additional Effort(s). Each effort code may be user defined and indicate a particular value ("Effort Value") of the Additional Effort (e.g., identifying the value of goods/services that will be expended), and a UOM or Unit of Measure (e.g., identifying the unit of measure of the effort value, such as a time unit, monetary unit, etc.). Examples of Effort Codes are shown in FIG. 7.

In view of the foregoing, the inspection of product returns can initiate a set of activities in different management systems (e.g., Follow-up Activities in WM and Customer Management and Additional Effort in CRM). Through the use of disposition and/or effort codes, a simple way for permitting warehouse employees to capture inspection results is provided. Flexibility is also provided by enabling such codes to be user-defined and customizable. Thus, a supplier is a able to manage product returns according to the needs of, for example, customers or the system environment.

While certain features and embodiments of the invention have been described, other embodiments of the invention will be apparent to those skilled in the art from consideration of the specification and practice of the embodiments of the invention disclosed herein. Furthermore, although embodiments of the present invention have been described as being associated with data stored in memory and other storage mediums, one skilled in the art will appreciate that these aspects can also be stored on or read from other types of computer-readable media, such as secondary storage devices, like hard disks, floppy disks, or a CD-ROM, a carrier wave from the Internet, or other forms of RAM or ROM. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A method for processing a product return using a plurality of management systems, comprising:
    inspecting the product return to determine a disposition decision for the product return, the disposition decision reflecting the results of the inspection;
    identifying an activity to be performed for the product based on the disposition decision, the activity comprising at least an additional effort activity;
    capturing the disposition decision for the product return in a computer based first management system;
    communicating the captured disposition decision from the computer based first management system to a computer based second management system, the computer based second management system determining at least one process to be performed depending on the additional effort activity; and
    triggering the computer based first management system to perform at least the additional effort activity and the computer based second management system to perform the determined process.

2. The method of claim 1, wherein the computer based first management system is a computer based warehouse management system.

3. The method of claim 2, wherein the computer based second management system is a computer based customer relationship management (CRM) system, and the at least one process is updating a customer account.

4. The method of claim 1, wherein the computer based first management system is a computer based warehouse management system and the computer based second management system is a computer based customer relationship management (CRM) system, and wherein the method further comprises sending a CRM notification from the computer based warehouse management system to the CRM system.

5. The method of claim 4, wherein triggering comprises updating a customer account with the CRM system based on the CRM notification.

6. The method of claim 1, wherein the at least one process is performing customer management.

7. The method of claim 1, further comprising triggering, in response to the captured disposition decision, at least one process in the computer based first management system, the computer based first management system comprising a computer based warehouse management system.

8. A method for processing a returned product, the method comprising:
    inspecting the product return to determine a disposition decision for the product return, the disposition decision reflecting the results of the inspection;
    capturing, in a computer based first management system, a decision code representing the determined disposition decision of the returned product, the decision code uniquely identifying a set of activities, at least one of the set of activities comprising an additional effort activity;
    communicating the captured disposition code from the computer based first management system to a computer based second management system, the computer based second management system determining at least one process to be performed depending on the set of activities; and
    triggering the computer based first management system to perform at least the additional effort activity and the computer based second management system to perform the determined process.

9. The method of claim 8, further comprising:
    providing a unique identifier to identify the returned product; and
    communicating the decision code and the unique identifier from the computer based first management system to the computer based second management system.

10. The method of claim 8, wherein the computer based first management system comprises a computer based warehouse management system, and wherein the triggering further comprises creating, in the computer based warehouse management system, a transfer order for the returned product.

11. The method of claim 8, wherein the computer based second management system comprises a customer relationship management (CRM) system, and wherein the triggering further comprises sending, to the CRM system, a CRM notification for the returned product and updating, in the CRM system, a customer account based on the CRM notification for the returned product.

12. A method for processing a product return, comprising:
providing a set of decision codes;
inspecting the product return at a warehouse and selecting a decision code from the set of decision codes, the decision code reflecting the results of the inspection;
identifying an activity to be performed for the product based on the selected decision code, the activity comprising at least an additional effort activity and indicating to a first computer based management system the activity to be performed for the product;
updating a record, in a computer based second management system, for the product return to include the decision code, the computer based second management system communicating the decision code to the entity that returned the product return; and
triggering the computer based first management system to perform at least the additional effort activity and the computer based second management system to perform a process depending on the additional effort activity.

13. The method of claim 12, wherein the record comprises a warehouse (WH) request and a unique identifier for the product return.

14. The method of claim 12, wherein the triggering further comprises issuing a transfer order for the product return based on the decision code.

15. The method of claim 14, wherein the method further comprises transferring the product return in response to the transfer order and performing a follow-up activity on the product return.

16. The method of claim 12, wherein the method further comprises communicating a disposition decision based on the inspection result to a computer based customer relationship management (CRM) system.

17. A non-transitory computer-readable medium comprising instructions for carrying out a method for processing a product return, the method comprising:
inspecting the product return to determine a disposition decision for the product return, the disposition decision reflecting the results of the inspection;
identifying an activity to be performed for the product based on the disposition decision, the activity comprising at least an additional effort activity;
capturing the disposition decision for the product return in a computer based first management system;
communicating the captured disposition decision from the computer based first management system to a computer based second management system, the computer based second management system determining at least one process to be performed depending on the additional effort activity; and
triggering the computer based first management system to perform at least the additional effort activity and the computer based second management system to perform the determined process.

18. The computer-readable medium of claim 17, wherein the computer based first management system is a computer based warehouse management system.

19. The computer-readable medium of claim 18, wherein the computer based second management system is a computer based customer relationship (CRM) management system, and the at least one process is performing customer management.

20. The computer-readable medium of claim 17, wherein the computer based first management system is a computer based warehouse management system and the computer based second management system is a computer based customer relationship management (CRM) system, and wherein the method further comprises communicating a CRM notification from the computer based warehouse management system to the CRM system.

21. The computer-readable medium of claim 20, wherein triggering further comprises updating a customer account with the CRM system based on the CRM notification.

22. The computer-readable medium of claim 17, wherein the at least one process is performing customer management.

23. The computer-readable medium of claim 17, further comprising triggering, in response to the captured disposition decision, at least one process in the computer based first management system, the computer based first management system comprising a computer based warehouse management system.

24. A non-transitory computer-readable medium comprising instructions for carrying out a method for processing a returned product, the method comprising:
inspecting a returned product to determine a disposition decision for the returned product, the disposition decision reflecting the results of the inspection;
capturing, in a computer based first management system, a decision code representing the determined disposition decision of the returned product, the decision code uniquely identifying a set of activities, at least one of the set of activities comprising an additional effort activity;
communicating the captured disposition decision from the computer based first management system to a computer based second management system, the computer based second management system determining at least one process to be performed depending on the set of activities; and
triggering the computer based first management system to perform at least the additional effort activity and the computer based second management system to perform the determined process.

25. The computer-readable medium of claim 24, wherein the computer based second management system is a computer based customer relationship management (CRM) system and the triggering further comprises triggering an update to a customer account with the CRM system based on the decision code.

26. The computer-readable medium of claim 24, wherein the computer based first management system comprises a computer based warehouse management system, and wherein the triggering further comprises creating, in the computer based warehouse management system, a transfer order for the returned product.

27. The computer-readable medium of claim 24, wherein the computer based second management system comprises a computer based customer relationship management (CRM) system, and wherein the triggering further comprises sending, to (CRM) system, a CRM notification to trigger customer management.

28. A non-transitory computer-readable medium comprising instructions for carrying out a method for processing a product return, the method comprising:
providing a set of decision codes;

inspecting the product return at a warehouse and selecting a decision code from the set of decision codes, the decision code reflecting the results of the inspection;

identifying an activity to be performed for the product based on the selected decision code, the activity comprising at least an additional effort activity, and indicating to a first computer based management system the activity to be performed for the product;

updating, in a computer based first management system, a record for the product return to include the decision code, the computer based first management system communicating the decision code to the computer based second management system; and triggering the computer based first management system to perform at least the additional effort activity and the computer based second management system to perform a process depending on the additional effort activity.

29. The computer-readable medium of claim 28, wherein the computer based first management system comprises a warehouse management system, and wherein the record comprises a warehouse request (WHR).

30. The computer-readable medium of claim 28, wherein the computer based second management system comprises a computer based customer relationship management (CRM) system.

31. The computer-readable medium of claim 30, wherein the triggered process comprises triggering the CRM system to update a customer account based on the disposition decision.

32. The computer-readable medium of claim 28, wherein the method further comprises transferring the product return based on the update of the record in the computer based first management system.

33. A system for processing a product return, the system comprising:

a computer based first management hardware module for receiving a decision code and creating, in response to receiving the decision code, a first record relating to the product return, the first record containing the decision code and an identification of an activity to be performed for a product, the activity comprising at least an additional effort activity; and a computer based second management hardware module for receiving the first record and for initiating an update to a second record in response to receiving the record, and based on the decision code received from the first record, and the computer based second management module updating the second record;

the computer based first management hardware module being triggered to perform at least the additional effort activity and the computer based second management module to perform a process depending on the additional effort activity.

34. The system of clam 33, wherein the computer based first management module is a warehouse management module.

35. The system of clam 34, wherein the computer based second management module is a customer relationship management (CRM) module.

36. The system of clam 35, wherein the first record comprises a CRM notification.

37. The system of clam 35, wherein the second record comprises a customer account.

38. The system of clam 33, wherein the decision code uniquely identifies a set of activities to be performed in accordance with a disposition decision for the product return.

39. The system of claim 33, wherein a unique identifier for the product return is received by the computer based second management module when receiving the first record.

40. The system of claim 33, wherein the computer based first management module issues a transfer order to transfer the product return based on the decision code.

41. The system of claim 33, wherein an effort code for an additional effort activity related to the product return is received by the computer based second management module when receiving the first record.

42. The system of claim 41, wherein the computer based second management module determines, based on the effort code, an effort value to charge a customer account for the additional effort activity.

\* \* \* \* \*